United States Patent
Miyamoto

(10) Patent No.: US 7,536,142 B2
(45) Date of Patent: May 19, 2009

(54) TRANSFER BELT AND FULL COLOR IMAGE-FORMING APPARATUS EQUIPPED THEREWITH

(75) Inventor: Takahito Miyamoto, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 560 days.

(21) Appl. No.: 11/010,367

(22) Filed: Dec. 14, 2004

(65) Prior Publication Data

US 2006/0062607 A1    Mar. 23, 2006

(30) Foreign Application Priority Data

Sep. 22, 2004   (JP)   ............... 2004-274692

(51) Int. Cl.
```
B32B 27/08    (2006.01)
B32B 27/36    (2006.01)
B32B 27/34    (2006.01)
B32B 27/00    (2006.01)
G03G 15/16    (2006.01)
```
(52) U.S. Cl. .................. 399/297; 428/35.7; 428/412; 428/474.4; 428/473.5; 428/480

(58) Field of Classification Search .............. 428/292.1, 428/412, 36.7, 474.4, 473.3, 35.7, 473.5, 428/480; 399/297

See application file for complete search history.

(56) References Cited

U.S. PATENT DOCUMENTS

| | | | |
|---|---|---|---|
| 6,139,784 A | 10/2000 | Oshima et al. | |
| 6,728,502 B2 * | 4/2004 | Hara | 399/176 |
| 6,751,434 B2 | 6/2004 | Kusayanagi et al. | |
| 7,007,943 B2 * | 3/2006 | Kanome et al. | 271/18.1 |
| 2006/0153669 A1 * | 7/2006 | Miller et al. | 414/800 |

FOREIGN PATENT DOCUMENTS

| | | |
|---|---|---|
| JP | 11-256068 | 9/1999 |
| JP | 2002-202668 | 7/2002 |
| JP | 2003-128905 | * 5/2003 |
| JP | 2003-280406 | * 10/2003 |

OTHER PUBLICATIONS

A Notification of Reasons for Refusal, mailed Oct. 2, 2007, issued in corresponding Japanese Patent Application No. 2004-274692, and translation thereof.

* cited by examiner

*Primary Examiner*—D. Lawrence Tarazano
*Assistant Examiner*—Camie S Thompson
(74) *Attorney, Agent, or Firm*—Buchanan Ingersoll & Rooney PC

(57) ABSTRACT

A transfer belt that contains carbon black A, that is acidic carbon black having a pH value of not more than 6 or basic carbon black having a pH value of not less than 8; resin B, that is a polymer capable of serving as an electron-pair donator or as an electron-pair acceptor with respect to carbon black A; and resin C, that is a polymer which neither serves as an electron-pair donator, nor serves as an electron-pair acceptor, with respect to carbon black A, and a full color image-forming apparatus, comprising the above transfer belt, and and a full color image-forming apparatus equipped with the belt.

22 Claims, 1 Drawing Sheet

TRANSFER BELT AND FULL COLOR IMAGE-FORMING APPARATUS EQUIPPED THEREWITH

This application is based on application(s) No. 2004-274692 filed in Japan, the contents of which are hereby incorporated by reference.

BACKGROUND OF THE INVENTION

1. Field of the Invention

The present invention relates to a belt for use as a transfer member in an electrophotographic process, that is, a transfer belt, and a full color image-forming apparatus equipped with the transfer belt.

2. Description of the Related Art

With respect to image-forming apparatuses using an electrophotographic process, those which use an intermediate transfer system have been well known. In the intermediate transfer system, after having applied a constant charge onto a latent-image-supporting member made of a photosensitive member, an electrostatic latent image is formed thereon through a laser and the like, and the image is developed by using charged toner. Next, after the toner image on the latent-image-supporting member has been primary-transferred on a transfer belt, the toner image is further secondary-transferred onto a sheet of recording paper. In such an intermediate transfer system, it is necessary to maintain a uniform resistance distribution on the transfer belt in order to achieve high image quality.

The transfer belt is composed of resin in which a conductive substance such as carbon black is dispersed, and an attempt has been made to achieve a uniform resistance distribution on the transfer belt by properly dispersing the conductive substance therein. However, since the dispersing property of the conductive substance such as carbon black is generally low, at present, it is difficult to obtain a uniform resistance distribution.

For example, a method has been proposed in which the specific gravity of the resin of the transfer belt and the specific gravity of the conductive substance are made approximate with each other (U.S. Pat. No. 6,139,784); however, the dispersion of the conductive substance, in particular, carbon black, is still insufficient, failing to achieve a uniform resistance distribution.

Moreover, for example, a method using acidic carbon has been proposed (U.S. Pat. No. 6,751,434); however, although this method improves the dispersing property of carbon black, it becomes difficult to control the conductivity since the amount of use of carbon black is limited.

SUMMARY OF THE INVENTION

The present invention is to provide a transfer belt that has superior resistance uniformity while maintaining a sufficient conductive property, and can prevent occurrence of image noise, and a full color image-forming apparatus equipped with the transfer belt.

The transfer belt in an image-forming apparatus comprises:
 carbon black A, that is acidic carbon black having a pH value of not more than 6;
 resin B, that is a polymer capable of serving as an electron-pair donator with respect to carbon black A; and
 resin C, that is a polymer which neither serves as an electron-pair donator nor serves as an electron-pair acceptor with respect to carbon black A, and a transfer belt in an image-forming apparatus, comprising:
 carbon black A, that is basic carbon black having a pH value of not less than 8;
 resin B, that is a polymer capable of serving an electron-pair acceptor with respect to carbon black A; and
 resin C, that is a polymer which neither serves as an electron-pair donator nor serves as an electron-pair acceptor with respect to carbon black A.

DETAILED DESCRIPTION OF THE INVENTION

Figure 1:
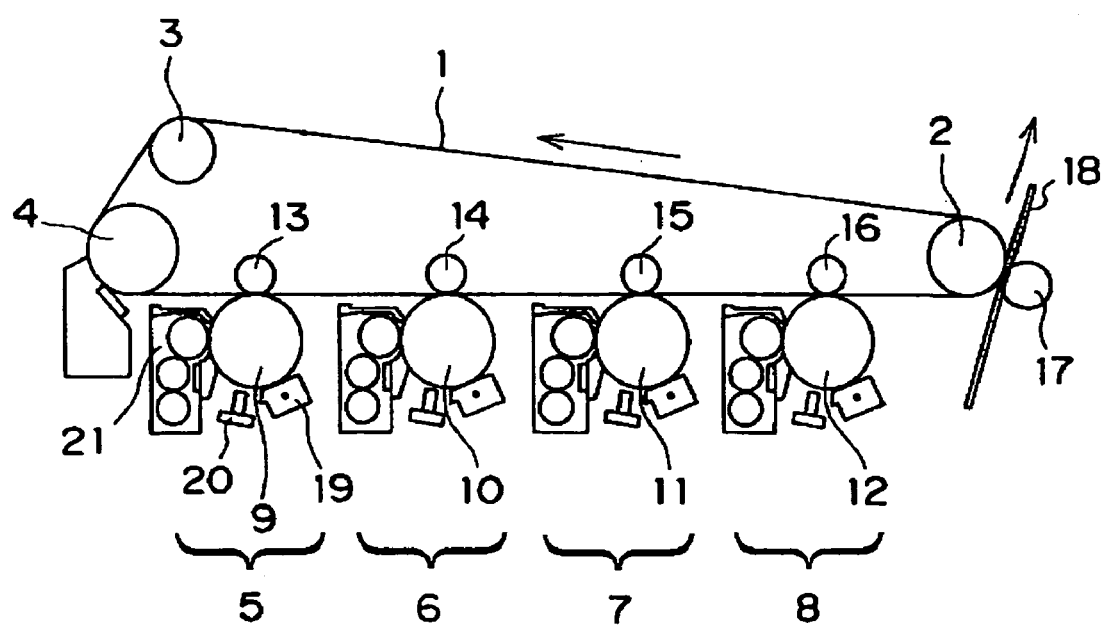
FIG. 1 is a schematic partial structural drawing that shows one example of an image-forming apparatus using an intermediate transfer system to which the transfer belt of the present invention is applicable.

The present invention relates to a transfer belt that contains carbon black A, that is acidic carbon black having a pH value of not more than 6 or basic carbon black having a pH value of not less than 8; resin B, that is a polymer capable of serving as an electron-pair donator or as an electron-pair acceptor with respect to carbon black A; and resin C, that is a polymer which neither serves as an electron-pair donator, nor serves as an electron-pair acceptor, with respect to carbon black A, and a full color image-forming apparatus equipped with the transfer belt.

The transfer belt of the present invention exerts superior resistance uniformity while maintaining a sufficient conductive property, and can provide high-quality images that are free from image noise.

The transfer belt of the present invention is suitably used as a transfer belt for use in an image-forming apparatus of an intermediate transfer system, in particular, as a seamless belt without a joining portion. The transfer belt of the present invention is applied to image-forming apparatuses including a mono-color image-forming apparatus having only a mono-color toner, a cycle-system full-color image-forming apparatus in which developing devices of Y(yellow), M(magenta), C(cyan) and B(black) are prepared for each of image-supporting members so that a developing process on the image-supporting member and a primary transferring process of the toner image onto the transfer belt are carried out on each of the developing devices of the respective colors, and a tandem-system full-color image-forming apparatus in which image-forming units of the respective colors, each having one developing device for one image-supporting member, are placed in series with one another so that a developing process on the image-supporting member and a primary transferring process of the toner image onto the transfer belt are carried out on each of the image-forming units of the respective colors.

For example, in the tandem-system full-color image-forming apparatus as shown in FIG. 1, a transfer belt 1 is passed over several rollers 2, 3 and 4, and image-forming units 5, 6, 7 and 8 of Y(yellow), M(magenta), C(cyan) and B(black) are placed along the transfer belt 1 in series with one another. The transfer belt 1 is rotated in the direction of arrow so that toner images, formed on the image-supporting members (photosensitive members) (9, 10, 11 and 12) in the respective image-forming units, are primary-transferred onto the transfer belt 1 successively by primary transferring rollers (13, 14, 15 and 16). Thereafter, a four-color toner image formed on the transfer belt 1 is secondary-transferred onto a sheet of recording paper 18 between a secondary transfer roller 17 and a pressure roller 2.

In each of the image-forming units (for example, 5), the surface of the image-supporting member (for example, 9) is uniformly charged by a charging device (for example, 19) so that an electrostatic latent image corresponding an image is formed thereon by an exposing device (for example, 20). The electrostatic latent image, thus formed, is developed by the developing device (for example, 21) so that, after the toner image has been transferred onto the transfer belt by a primary transfer roller (for example, 13), residual toner is removed by a cleaner or the like, not shown.

The transfer belt of the present invention to be used in the above-mentioned image-forming apparatus is made from a resin material which contains a conductive substance; and the present invention is characterized in that at least specific carbon black A is used as the conductive substance while specific resins B and C are contained in the resin material.

In the present invention, either one of acidic carbon black and basic carbon black is used as carbon black A. When both of these are used, the acidic carbon black and the basic carbon black aggregate with each other, and are not dispersed appropriately, failing to provide desired resistance uniformity in the transfer belt.

The acidic carbon black, which has an acidic group such as a carboxyl group and a sulfonic acid group on the surface thereof, is set to a pH value of not more than 6, preferably in a range from 5 to 3.

The basic carbon black, which has a basic group such as an amino group on the surface thereof, is set to a pH value of not less than 8, preferably in a range from 8 to 9.

With respect to the pH value of carbon black, values measured by the following method are used.

Carbon black (1 to 10 g) is weighed and put into a beaker, and pure water is added to this at a rate of 10 ml per 1 g of the sample, and the resulting mixture is covered with a watch glass and boiled for 15 minutes. After the boiling process, the mixture is cooled and the supernatant is removed so that a mud-state matter is left. The electrodes of a glass electrode pH meter are put into this so that the pH is measured on the basis of the measuring method in accordance with JIS Z8802.

With respect to the kinds of acidic carbon black and basic carbon black, not particularly limited as long as the respective pH values are maintained within the above-mentioned ranges, examples thereof include furnace black, channel black, acetylene black and ketchen black.

From the viewpoint of dispersing property, each of the average primary particle sizes of acidic carbon black and basic carbon black is preferably set in a range from 10 to 60 nm, more preferably from 25 to 50 nm.

Both of the acidic carbon black and the basic carbon black are available as commercial products.

For example, the acidic carbon black is commercially available as Printex V (made by Degussa Inc.), Special Black 35 (made by Degussa Inc.) and Raven 1250 (made by Columbia Carbon Co.).

Further, for example, the basic carbon black is commercially available as Printex L (made by Degussa Inc.), Printex 3 (made by Degussa Inc.) and Raven 450 (made by Columbia Carbon Co.).

Further, the acidic carbon black and the basic carbon black may be prepared by subjecting neutral carbon black, which will be described later, to a surface treatment. For example, the acidic carbon black is obtained through a surface treatment using a silane coupling agent containing a carboxyl group. Moreover, for example, the basic carbon black can be manufactured by using the same method as the above-mentioned acidic carbon black except that a silane coupling agent containing an amino group or the like is used as a treatment agent.

Although not particularly limited as long as the transfer belt is allowed to have desired conductivity, the content of carbon black A is preferably set in a range from 1 to 80% by weight, more preferably in a range from 5 to 50% by weight, with respect to the content of all the conductive substances, in order to further improve the resistance uniformity and the transferring property at the time of high humidity.

The transfer belt of the present invention may contain conductive substances other than the acidic carbon black and basic carbon black. Examples of the other conductive materials include carbon-based fillers such as neutral carbon black, carbon fibers and graphite; and metal fillers such as copper powder and Ni powder. Among these, from the viewpoint of chemical resistance, carbon black-based fillers, in particular, neutral carbon black, are preferably contained.

The neutral carbon black is carbon black having a pH value in a range from more than 6 to less than 8. With respect to the kinds of neutral carbon black, not particularly limited as long as the pH is maintained in the above-mentioned range, the same materials as those exemplified as the kinds of acidic carbon black and basic carbon black may be used.

The average primary particle size of the neutral carbon black is preferably set in the same range as that of the acidic carbon black and the basic carbon black.

The neutral carbon black is commercially available as acetylene black (made by Denka Co., Ltd.) and Raven 850 (made by Columbia Carbon Co.).

Not particularly limited as long as the objective of the present invention is achieved, the total content of the conductive substances is preferably set in a range from 8 to 20% by weight, more preferably from 10 to 15% by weight, with respect to the total content of resin B and resin C, which will be described later.

Resin B to be used in the present invention is a polymer that can serve as an electron pair donator or as an electron pair acceptor with respect to carbon black A. Resin B is determined depending on carbon black A, and when, for example, carbon black A is acidic carbon black, resin B is prepared as a polymer that can serve as an electron pair donator. When, for example, carbon black A is basic carbon black, resin B is prepared as a polymer that can serve as an electron pair acceptor.

In the present invention, the polymer that can serve as an electron pair donator refers to a polymer that can at least electrostatically attract the acidic group possessed by carbon black A with each other by its own non-covalent electron pairs, and also includes a polymer that can give non-covalent electron pairs to the acidic group possessed by carbon black A through chemical reactions. Hereinafter, such a polymer is referred to simply as "electron-donating polymer".

With respect to the electron-donating polymer, those polymers that contain atoms having non-covalent electron pairs can be used, and those polymers that contain nitrogen atoms and also have a thermoplastic property are preferably used. The content of atoms having non-covalent electron pairs, in particular, nitrogen atoms, in the polymer is not particularly limited as long as the objective of the present invention is achieved. Preferable examples thereof include polyamide, polyamide imide, and polyurethane polyurea. With respect to the electron-donating polymers, one kind thereof may be used alone, or two or more kinds of polymers may be used in combination. More preferably, polyamide is used alone as the electron-donating polymer.

Moreover, the polymer that can serve as the electron pair acceptor refers to a polymer that can at least electrostatically attract the basic group possessed by carbon black A or non-covalent electron pairs possessed by the basic group each other by its own carbon atoms that are susceptible to nucleophilic attack, and also includes a polymer that can receive non-covalent electron pairs possessed by the basic group of carbon black A through a chemical reaction. Hereinafter, such a polymer is referred to simply as "electron accepting polymer."

With respect to the electron accepting polymer, those polymers containing carbon atoms that are susceptible to nucleophilic attack can be used, and those polymers that contain carbon atoms bonded to the acidic group such as a carboxyl group or halogen atoms and also have a thermoplastic property are preferably used. The content of carbon atoms that are susceptible to nucleophilic attack in the polymer is not particularly limited as long as the objective of the present invention is achieved.

Preferable examples of the polymer having the acidic group include: carboxyl group-containing polyalkylene terephthalates such as polyethylene terephthalate and polybutylene terephthalate having a carboxyl group; and (meth) acrylic acid-containing polymers such as polyacrylate, polymethacrylate, an acrylic acid-(meth)acrylic acid ester copolymer and a methacrylic acid-(meth)acrylic acid ester copolymer. Among these, those having an acid value in a range from 2 to 20 KOH mg/g are preferably used.

With respect to the polymer containing carbon atoms bonded to halogen atoms, a halogenated polymer may be used. Since the halogen atom has a comparatively great electron-attracting property, the carbon atom that is bonded to the halogen atom exhibits δ+ polarization, and is susceptible to nucleophilic attack. Preferable specific examples thereof include fluorine atom-containing polymers such as polytetrafluoroethylene, PFA (tetrafluoroethylene-perfluoroalkoxy ethylene copolymer); and chlorine atom-containing polymers such as vinyl chloride, chlorinated polyethylene and chlorinated polypropylene.

With respect to the electron accepting polymers, one kind thereof may be used alone, or two or more kinds of polymers may be used in combination.

More preferably, a polymer having an acidic group, in particular, carboxyl group-containing polyalkylene terephthalate, is used alone as the electron accepting polymer.

The above-mentioned resin B is appropriately selected in combination with carbon black A and used, and resin C, which will be described later, is also used together so that it is possible to provide a transfer belt that has superior resistance uniformity while maintaining a sufficient conductive property, and can prevent occurrence of image noise.

More specifically, in the case when carbon black A is acidic carbon black while resin B is an electron-donating polymer, the acidic group possessed by the acidic carbon black tends to release hydrogen ions in water so that the hydrogen atom exhibits δ+ polarization in a melt-kneading process upon manufacturing a transfer belt. For this reason, the hydrogen atom mutually attracts the non-covalent electron pair possessed by the electron-donating polymer. As a result, the electron-donating polymer allows the acidic carbon black to exert a dispersion accelerating function so that even when the amount of use of the acidic carbon black is comparatively large, the acidic carbon black is preferably dispersed in resin C, which will be described later; thus, it becomes possible to simultaneously achieve a superior conductive property and superior resistance uniformity, to improve the transferring property because of the presence of resin C, and consequently to effectively prevent image noise.

In the case when carbon black A is basic carbon black while resin B is an electron accepting polymer, the basic group possessed by the basic carbon black tends to absorb hydrogen ions in water so that carbon black A exerts an electron donating property in a melt-kneading process upon manufacturing a transfer belt. In contrast, the acidic group possessed by the electron-donating polymer tends to release hydrogen ions in water so that the hydrogen atom exhibits δ+ polarization in the melt-kneading process upon manufacturing a transfer belt. Further, the carbon atom that is susceptible to nucleophilic attack and possessed by the electron accepting polymer also exhibits δ+ polarization. For this reason, the basic group of the basic carbon black mutually attracts the acidic group of the electron accepting polymer or the carbon atom that is susceptible to nucleophilic attack, electrostatically. As a result, the electron accepting polymer allows the basic carbon black to exert a dispersion accelerating function so that even when the amount of use of the basic carbon black is comparatively large, the basic carbon black is preferably dispersed in resin C, which will be described later; thus, it becomes possible to simultaneously achieve a superior conductive property and superior resistance uniformity, to improve the transferring property because of the presence of resin C, and consequently to effectively prevent image noise.

When an electron-donating polymer and an electron accepting polymer are used in combination with each other as resin B, resin B fails to allow carbon black A to effectively exert a dispersion accelerating function, resulting in a failure in providing a sufficient conductive property as well as in achieving desired resistance uniformity.

The molecular weight of resin B is not particularly limited as long as the objective of the present invention is achieved, and is preferably set, for example, in a range from 150 to 300° C., more preferably from 200 to 280° C., in its softening point.

In the present specification, with respect to the softening point of the resin, values obtained by a DSC (made by Seiko Instrument Inc.) were used; however, the device for measuring the softening point is not limited by the above-mentioned machine, and any device may be used as long as the measurements are carried out based on the same principle and rule.

Resin B is available as commercial products.

For example, polyamide is commercially available as 6,6-nylon (A226; made by Unitika Ltd.) and nylon 6 (A1030BRT; made by Unitika Ltd.).

Moreover, for example, polyamide imide is commercially available as TI polymer (made by Toray Industries, Inc.).

For example, polybutylene terephthalate containing a carboxyl group may be synthesized by processing commercial polybutylene terephthalate (for example, Novaduran (made by Mitsubishi Engineering Plastics Corp.) under a condition of excessive terephthalic acid.

Moreover, for example, polymer containing (meth)acrylic acid may be synthesized by copolymerizing (meth)acrylic acid with an ester such as (meth)acrylate.

The content of resin B is preferably set in a range from 1 to 20% by weight, more preferably from 5 to 10% by weight, with respect to the total content of resin B and resin C in order to further improve the resistance uniformity and the transferring property at high temperatures.

Resin C is a polymer that neither serves as an electron pair donator, nor serves as an electron-pair acceptor, with respect to carbon black A, that is, a polymer that contains none of an atom having a non-covalent electron pair, an acidic group and a carbon atom that is susceptible to nucleophilic attack, not depending on whether carbon black A is acidic carbon black or basic carbon black, and preferably, those polymers having a thermoplastic property are used. Without using resin C, the image quality is lowered and the transferring property deteriorates, in particular, at high humidity, resulting in image noise such as image losses.

Specific examples of preferable resin C include: polycarbonate, polyalkylene terephthalate having hydroxide groups at the two terminals, polyphenylene sulfide, polyether sulfone and polyacetal. With respect to resin C, one kind thereof may be used alone, or two or more kinds of polymers may be used in combination.

With respect to resin C, more preferably, polycarbonate and polyalkylene terephthalate having hydroxyl groups at the two terminals may be used in combination, or polyphenylene sulfide may be used alone.

The molecular weight of resin C is not particularly limited as long as the objective of the present invention is achieved, and is set, for example, in a range so as to exert the same softening point and melting point as resin B.

Resin C is available as commercial products. For example, polycarbonate is commercially available as NOVAREX (made by Mitsubishi Engineering Plastics Corp.) and 300 Series (made by Sumitomo Dow Ltd.).

Further, for example, polyalkylene terephthalate is commercially available as Novaduran (made by Mitsubishi Engineering Plastics Corp.).

Moreover, for example, polyphenylene sulfide is commercially available as TORELINA (made by Toray Industries, Inc.) and as C200SC (made by Idemitsu Kosan Co., Ltd.).

Moreover, for example, polyacetal is commercially available as NTB3501 (made by Okitsumo Incorporated.).

The transfer belt of the present invention may contain other additives as long as the objective of the present invention is achieved. Examples of those additives include a lubricant, an antioxidant, an ultraviolet-ray absorbent and the like.

The lubricant is used for improving the moldability into a belt, and examples thereof include aliphatic hydrocarbons such as paraffin wax and polyolefin wax, higher fatty acids having 9 or more carbon atoms such as lauric acid, myristic acid, palmitic acid, stearic acid, behenic acid, montan acid, melissic acid, oleic acid and erucic acid, higher fatty acid metal salts such as sodium salt, lithium salt, calcium salt, magnesium salt, zinc salt and aluminum salt of the higher fatty acids, higher aliphatic alcohols such as stearyl alcohol, higher aliphatic amides such as stearic acid amide, erucic acid amide and ethylene bisstearic acid amide, and higher fatty acid esters such as stearyl stearate and montan wax. Preferably, higher fatty acid metal salts, in particular, calcium montanate, sodium montanate, aluminum stearate and calcium stearate, may be used.

The transfer belt of the present invention may be produced through any method as long as it carries out a molding process into a belt. In particular, when a seamless belt is desirably used as the transfer belt, for example, a continuous melt-extrusion molding method is preferably adopted. In the continuous melt-extrusion molding method, an annular die is attached to a single-axis extruder, and a mixture consisting of the above-mentioned materials is charged into the extruder so that the molten resin composition is continuously extruded from a resin discharging outlet having a seamless belt shape at the annular die tip. Thereafter, this is externally applied to a cooling cylinder having a cooling mechanism so that the resin is solidified to prepare a seamless tube having a cylinder shape; thus, the seamless tube is cut into a predetermined length to provide a seamless transfer belt. In the present invention, preferably, carbon black A and resin B are preliminarily melt-kneaded prior to a mixing process with resin C and the other conductive material and additives. Thus, carbon black A is dispersed more effectively.

In this case, in order to prevent crystallization, immediately after having been discharged from the metal mold, the belt is preferably cooled by using water, air, a cooled metal block or the like. More specifically, a cooling tube attached to the metal mold with a thermal insulating material interpolated in between is used so that the heat of the belt is quickly drained. Water, which is always temperature-adjusted to not more than 30° C., is circulated inside the cooling tube. The belt, discharged from the metal mold, may be drawn at a high speed to be formed into a thin film so as to increase the cooling rate. In this case, the drawing speed is set to not less than 1 m/min, preferably to 2 to 7 m/min.

EXAMPLES

In the present example, the following materials were used.

PBT-I: Polybutylene terephthalate (Novaduran; made by Mitsubishi Engineering Plastics Corp.);

PBT-II: obtained by allowing PBT-I to react under a condition of excessive terephthalic acid (200° C., 48 hours, catalyst: tetrabutyl titanate);

PC: Polycarbonate (NOVAREX; made by Mitsubishi Engineering Plastics Corp.);

Ny: 6,6-nylon (A226; made by Unitika Ltd.);

PPS: Polyphenylene sulfide (TORELINA; made by Toray Industries, Inc.)

Acetylene Black (made by Denka Co., Ltd., pH 7);

Printex V (made by Degussa Inc, pH4.5)

Printex L (made by Degussa Inc, pH 9)

<Belt Production>

Examples 1 to 13 and Comparative Examples 1 to 7

Each of mixtures consisting of resin B, resin C and carbon black shown in Table 1, Table 2 or Table 3 was melt-kneaded by a twin-axis extruder to prepare an extruded resin composition. Next, the resin composition was extrusion-molded by using a molding machine to which an annular die is attached so that a seamless transfer belt was obtained.

<Evaluation>

(Conductivity)

A resistance meter, "Hiresta (trade name)" (Mitsubishi Yukadenshi Co., Ltd.), was used so that surface resistance value R was measured at the applied voltage of 500 V. The measurements were carried out at 24 points with equal intervals in the circumferential direction, and the average value $R_{AV}$ was found.

◯: $1 \times 10^9 \leq R_{AV} < 1 \times 10^{11}$;

X: $R_{AV} < 1 \times 10^9$ or $1 \times 10^{11} < R_{AV}$ (Resistance Uniformity)

With respect to the surface resistance values R at 24 points measured in the evaluation of conductivity, the maximum value $R_{MAX}$ and the minimum value $R_{MIN}$ were extracted, and Log $(R_{MAX}/R_{MIN})$ was found.

◯: Log $(R_{MAX}/R_{MIN}) < 0.5$;

Δ: $0.5 \leq$ Log $(R_{MAX}/R_{MIN}) \leq 1.0$ (No problem was raised in practical use.);

X: $1.0 \leq$ Log $(R_{MAX}/R_{MIN})$ (Image Quality)

By using a color laser beam printer made by Konica Minolta Business Technologies, Inc. (Color Page Pro) in which each of the seamless belts obtained in the respective examples and comparative examples was attached, each of toner images of yellow, magenta, cyan and black was transferred from the intermediate transfer belt to a sheet of recording paper, under the following environment; then, each of the images was visually observed for any image noise, such as image losses and fogging, and evaluated.

NN environment condition: temperature 25° C., humidity 60%

HH environment condition: temperature 35° C., humidity 85%

○: No image noise was confirmed;

Δ: Slight image noise was confirmed (practically applicable level);

X: Image noise was clearly confirmed.

TABLE 1

|  | Example-1 | Example-2 | Example-3 | Example-4 | Example-5 | Example-6 |
|---|---|---|---|---|---|---|
| Resin C: Matrix (weight ratio) | PBT-I/PC (50/50) | PBT-I/PC (50/50) | PBT-I/PC (50/50) | PBT-I/PC (50/50) | PBT-I/PC (50/50) | PBT-I/PC (50/50) |
| Resin B | Ny (electron-donating) | Ny (electron-donating) | Ny (electron-donating) | Ny (electron-donating) | Ny (electron-donating) | Ny (electron-donating) |
| Resin C/Resin B (parts by weight) | 85/5 | 85/5 | 85/5 | 86.4/4.6 | 86.4/4.6 | 87.3/4.7 |
| B/(B + C) | 5.5% | 5.5% | 5.5% | 5% | 5% | 5.1% |
| Carbon black ① | Acetylene black | Acetylene black | Acetylene black | Acetylene black | Acetylene black | Acetylene black |
| parts by weight | 9.7 | 9.5 | 6.4 | 4 | 1.4 | 0.8 |
| Carbon black ② (Carbon black A) | Printex V | Printex V | Printex V | Printex V | Printex V | Printex V |
| parts by weight | 0.3 | 0.5 | 3.6 | 5 | 7.6 | 7.2 |
| ②/(①+②) | 3%(acidic) | 5%(acidic) | 36%(acidic) | 55.6%(acidic) | 15.6%(acidic) | 10%(acidic) |
| Conductive property | ○ | ○ | ○ | ○ | ○ | ○ |
| Resistance uniformity | Δ | ○ | ○ | ○ | ○ | ○ |
| Image evaluation NN | Δ | ○ | ○ | ○ | ○ | ○ |
| Image evaluation HH | Δ | ○ | ○ | ○ | Δ | Δ |

TABLE 2

|  | Example-7 | Example-8 | Example-9 | Example-10 | Example-11 | Example-12 | Example-13 |
|---|---|---|---|---|---|---|---|
| Resin C: Matrix (weight ratio) | PBT-I/PC (50/50) | PBT-I/PC (50/50) | PBT-I/PC (50/50) | PBT-I/PC (50/50) | PPS | PPS | PPS |
| Resin B | Ny (electron-donating) | Ny (electron-donating) | Ny (electron-donating) | Ny (electron-donating) | Ny (electron-donating) | Ny (electron-donating) | PBT-II (electron-accepting) |
| Resin C/Resin B (parts by weight) | 81.7/4.3 | 75.4/8.6 | 68.8/17.2 | 63/27 | 81.7/4.3 | 85.1/0.9 | 81.7/4.3 |
| B/(B + C) | 5% | 10% | 20% | 30% | 5% | 1% | 5% |
| Carbon black ① | Acetylene black | Acetylene black | Acetylene black | Acetylene black | Acetylene black | Acetylene black | Acetylene black |
| parts by weight | 11.2 | 11.2 | 11.2 | 8 | 9 | 9 | 9 |
| Carbon black ② (Carbon black A) | Printex V | Printex V | Printex V | Printex V | Printex V | Printex V | Printex L |
| parts by weight | 2.8 | 2.8 | 2.8 | 2 | 5 | 5 | 5 |
| ②/(①+②) | 20%(acidic) | 20%(acidic) | 20%(acidic) | 20%(acidic) | 35.7%(acidic) | 35.7%(acidic) | 35.7%(basic) |
| Conductive property | ○ | ○ | ○ | ○ | ○ | ○ | ○ |
| Resistance uniformity | ○ | ○ | ○ | ○ | ○ | ○ | ○ |
| Image evaluation NN | ○ | ○ | ○ | ○ | ○ | ○ | ○ |
| Image evaluation HH | ○ | ○ | ○ | Δ | ○ | ○ | ○ |

TABLE 3

|  | Comparative Example-1 | Comparative Example-2 | Comparative Example-3 | Comparative Example-4 | Comparative Example-5 | Comparative Example-6 | Comparative Example-7 |
|---|---|---|---|---|---|---|---|
| Resin C: Matrix (weight ratio) | PBT-I/PC (50/50) | PBT-I/PC (50/50) | PBT-I/PC (50/50) | PBT-I/PC (50/50) | PBT-I/PC (50/50) | PPS | PPS |
| Resin B | — | — | — | Ny (electron-donating) | Ny (electron-donating) | PBT-II (electron-accepting) | PBT-II (electron-accepting) |
| Resin C/Resin B (parts by weight) | 90/0 | 90/0 | 90/0 | 72/17 | 81.7/4.3 | 72/17 | 81.7/4.3 |
| B/(B + C) | 0 | 0 | 0 | 19.1% | 5% | 19.1% | 5% |
| Carbon black ① | Acetylene black | Acetylene black | Acetylene black | Acetylene black | Acetylene black | Acetylene black | Acetylene black |
| parts by weight | 10 | 9 | 9 | 11 | 9 | 11 | 9 |
| Carbon black ② (Carbon black A) | — | Printex L | Printex V | — | Printex L | — | Printex V |
| parts by weight | 0 | 5 | 5 | 0 | 5 | 0 | 5 |

TABLE 3-continued

|  | Comparative Example-1 | Comparative Example-2 | Comparative Example-3 | Comparative Example-4 | Comparative Example-5 | Comparative Example-6 | Comparative Example-7 |
|---|---|---|---|---|---|---|---|
| ②/(①+②) | 0 (neutral) | 35.7% (basic) | 35.7% (acidic) | 0 (neutral) | 35.7% (basic) | 0 (neutral) | 35.7% (acidic) |
| Conductive property | ○ | ○ | ○ | ○ | ○ | ○ | ○ |
| Resistance uniformity | x | x | x | x | x | x | x |
| Image evaluation NN | x | x | x | x | x | x | x |
| Image evaluation HH | x | x | x | x | x | x | x |

What is claimed is:

1. A transfer belt in an image-forming apparatus, comprising:
   carbon black A, that is acidic carbon black having a pH value of not more than 6;
   resin B, that is a polymer capable of serving as an electron-pair donator with respect to carbon black A; and
   resin C, that is a polymer which is neither an electron-pair donator nor an electron-pair acceptor with respect to carbon black A, and
   wherein the transfer belt is free of a resin that is an electron-pair acceptor with respect to carbon black A.

2. The transfer belt according to claim 1, wherein the content of resin B is set in a range from 1 to 20% by weight with respect to the total content of resin B and resin C.

3. The transfer belt according to claim 1, wherein the content of carbon black A is set in a range from 1 to 80% by weight with respect to the content of all conductive substances.

4. The transfer belt according to claim 1, wherein the resin B is a nitrogen atom-containing polymer.

5. The transfer belt according to claim 1, wherein the resin B is at least one resin selected from the group consisting of polyamide, polyamide imide, and polyurethane polyurea.

6. The transfer belt according to claim 1, wherein the resin C is at least one resin selected from the group consisting of polycarbonate, polyalkylene terephthalate having hydroxide groups at the two terminals, polyphenylene sulfide, polyether sulfone and polyacetal.

7. The transfer belt according to claim 1, wherein the resin B and the resin C are thermoplastic resins and the transfer belt is produced by a continuous melt-extrusion molding method.

8. The transfer belt according to claim 1, wherein the carbon black A has an average primary particle size in a range from 10 to 60 nm.

9. The transfer belt according to claim 1, wherein the carbon black A has an average primary particle size in a range from 25 to 50 nm.

10. The transfer belt according to claim 3, wherein the content of carbon black A is set in a range from 5 to 50% by weight with respect to the content of all conductive substances.

11. A transfer belt in an image-forming apparatus, comprising:
    carbon black A, that is basic carbon black having a pH value of not less than 8;
    resin B, that is a polymer and is an electron-pair acceptor with respect to carbon black A; and
    resin C, that is a polymer which is neither an electron-pair donator nor an electron-pair acceptor with respect to carbon black A, and
    wherein the transfer belt is free of a resin that is an electron-pair donator with respect to carbon black A.

12. The transfer belt according to claim 11, wherein the content of resin B is set in a range from 1 to 20% by weight with respect to the total content of resin B and resin C.

13. The transfer belt according to claim 11, wherein the content of carbon black A is set in a range from 1 to 80% by weight with respect to the content of all conductive substances.

14. The transfer belt according to claim 11, wherein the resin B is a polymer containing a carbon atom bonded to an acidic group or a halogen atom.

15. The transfer belt according to claim 11, wherein the resin B is at least the one selected from the group consisting of carboxyl group-containing polyalkylene terephthalates and (meth)acrylic acid-containing polymers 16. The transfer belt according to claim 11, herein the resin C is at least one resin selected from the group consisting of polycarbonate, polyalkylene terephthalate having hydroxide groups at the two terminals, polyphenylene sulfide, polyether sulfone and polyacetal.

17. The transfer belt according to claim 11, wherein the resin B and the resin C are thermoplastic resins and the transfer belt is produced by a continuous melt-extrusion molding method.

18. The transfer belt according to claim 11, wherein the carbon black A has an average primary particle size in a range from 10 to 60 nm.

19. The transfer belt according to claim 8, wherein the carbon black A has an average primary particle size in a range from 25 to 50 nm.

20. The transfer belt according to claim 13, wherein the content of carbon black A is set in a range from 5 to 50% by weight with respect to the content of all conductive substances.

21. A transfer belt in an image-forming apparatus, comprising:
    carbon black A, that is acidic carbon black having a pH value of not more than 6;
    resin B, that is a polymer and is an electron-pair donator with respect to carbon black A; and
    resin C, that is a polymer which is neither an electron-pair donator nor an electron-pair acceptor with respect to carbon black A,
    wherein the transfer belt is free of a resin that is an electron-pair acceptor with respect to carbon black A, and
    wherein the molecular weight of the resin B and the resin C is in a range where the softening point of the resin B and the resin C is from 150 to 300° C.

22. A transfer belt in an image-forming apparatus, comprising:
    carbon black A, that is basic carbon black having a pH value of not less than 8;
    resin B, that is a polymer and is an electron-pair acceptor with respect to carbon black A; and resin C, that is a polymer which is neither an electron-pair donator nor an electron-pair acceptor with respect to carbon black A, wherein the transfer belt is free of a resin that is an electron-pair donator with respect to carbon black A, and wherein the molecular weight of the resin B and the resin C is in a range where the softening point of the resin B and the resin C is from 150 to 300°C.

* * * * *

UNITED STATES PATENT AND TRADEMARK OFFICE
CERTIFICATE OF CORRECTION

PATENT NO. : 7,536,142 B2
APPLICATION NO. : 11/010367
DATED : May 19, 2009
INVENTOR(S) : Takahito Miyamoto It is certified that error appears in the above-identified patent and that said Letters Patent is hereby corrected as shown below:

Claim 1, Column 11, Line 18: delete "capable of serving as"; add --and is--
[should read: resin B, that is a polymer and is an electron-pair donator . . . ]

Claim 16, Column 12, Line 27: change "herein" to --wherein--.

Signed and Sealed this

Seventeenth Day of November, 2009

David J. Kappos
*Director of the United States Patent and Trademark Office*